United States Patent Office 3,328,390
Patented June 27, 1967

3,328,390
CERTAIN AZABICYCLOALKANE COMPOUNDS
Charles H. Grogan, Falls Church, Va., assignor to Tri-Kem Corporation, Washington, D.C., a corporation of the District of Columbia
No Drawing. Filed Feb. 27, 1962, Ser. No. 176,110
8 Claims. (Cl. 260—239)

The present invention relates to novel synthetic organic compounds having significant pharmacological activity on the central nervous system and, more particularly, to novel heterocyclic nitrogen compounds having centeral nervous system activity.

The instant application has a number of significant objects. A primary object of the present invention is to provide novel, pharmacologically active organic compounds characterized by their central nervous system activity.

It is another principal object of the instant invention to provide N-substituted aryl alkyl ketone heterocycles possessing central nervous system activity and the simple acid addition and quaternary salts of such heterocycles.

These and further objects of the present invention will become more apparent by reference to the ensuing description and appended claims.

Formula 1 illustrates the general structural formula of the novel free bases of the instant invention:

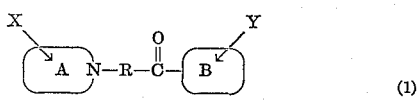

(1)

In this formula there are five essential elements: (a) the ring system A; (b) the substituent X on ring system A; (c) the substituent [R—C=O]; (d) the ring B; and (e) the substituent Y on ring B.

Ring system A is an azabicyclo or azatricyclo ring system, other than ring systems containing a heterospirane nucleus, containing at least six atoms, one of which is a basic nitrogen atom, the others preferably (through not necessarily) being carbon atoms. While there is no particular upper limit for the number of atoms in ring system A, best results are obtained with a ring system containing from 6 to 14 atoms and preferably 8 to 10 atoms. Substituents X and Y are selected from the group consisting of hydrogen, alkyl, alkenyl alkoxy, chlorine, bromine, iodine and fluorine, or any combination or multiplicity of these groups. While, as noted, X and Y may be iodine, iodine is not as effective as the other halogens. R is an alkylene group. While not necessarily so restricted, R preferably contains from 1 to 6 carbon atoms and best results are obtained when R is a propyl or propylene grouping. Ring B is an aromatic ring consisting of either phenyl or thienyl.

As has previously been indicated, a feature of the present invention resides in the discovery that extremely potent tranquilizers are obtained when aryl alkyl ketones are substituted on the nitrogen atom of the azabicyclic and azatricyclic structures of the present invention. The most pronounced tranquilizing activity is obtained from the compounds of the present invention when ring system A of the compound is saturated or contains one or more unsaturated linkages not forming together an aromatic ring. If one of the rings forming part of ring system A is aromatic, the useful tranquilizing activity is diminished and the tremor producing activity is increased. For example, certain members of the 2-azabicyclo[4.4.0]-decane system, as represented by 1,2,3,4-tetrahydroisoquinoline, of the 1-azabicyclo[4.3.0]nonane system, as represented by indoline, and of the 2-azabicyclo[4.3.0]-nonane system, as represented by tetrachloroisoindoline, yield compounds, even when the most active nitrogen substituent is employed in the ring system, that have decreased activity as tranquilizers, increased tremor producing activity and increased toxicity.

The bridging of ring A with an additional group, such as oxygen, methylene or ethylene, to form an azatriciclo structure, does not alter the basic useful properties of the novel compounds of the present invention.

Of the various values of Y listed above, the most potent and useful tranquilizers result when Y is fluorine. The fluorine substituent is unique in that the potency of the fluorinated compound is increased, undesirable side-effects are diminished and prolonged activity is obtained. Substituting chlorine for the fluorine substituent, for example, decreases the activity of the compound and increases tremor production. So effective are the novel heterocyclic-fluoro aryl alkyl ketones of the present invention with respect to their potency and duration of activity that the only known classes of useful tranquilizers currently on the market which approach these ketones in the respects noted are those derived from the phenothiazine nucleus. The novel compounds of the present invention thus represent a new class of potent tranquilizers not derived from phenothiazine.

The novel compounds of the present invention may conveniently be synthesized by refluxing about one molar equivalent of an appropriate haloalkylaryl ketone with at least about two molar equivalents of the desired azabicyclo or azatricyclo secondary amine in an inert solvent such as benzene, toluene or the xylenes. Usually, toluene serves as the most generally satisfactory solvent medium and the yield can be governed by the reflux time.

In lieu of the two molar equivalents of the azabicyclo or azatricyclo secondary amine, equimolecular quantities of the azabicyclo (or tricyclo) amine and a hindered tertiary amine, for example, diisopropyl ethylamine (as an acid acceptor), may be used.

Examples of secondary amine azabicyclo or azatricyclo systems which may be used to form the compounds of the present invention are: hexahydroisoindoline (2-azabicyclo[4.3.0]nonane); 4,7,8,9-tetrahydroisoindoline; 4,7-epoxyhexahydroisoindoline; 5-allyl-perhydroisoindoline; 5,6-dimethoxy-isoindoline; 4 - methyl-4,7-epoxypentahydro-isoindoline; 4,7-dimethyl-4,7-epoxytetrahydroisoindoline; 4,7-epoxy-8,9-dimethylperhydroisoindoline; 4,7-endomethano-4,7,8,9-tetrahydroisoindoline; 4,7-endoethano-4,7,8,9-tetrahydroisoindoline; 3-azabicyclo[3.2.1]octane; 1,8,8-trimethyl-3-azabicyclo[3.2.1]octane (camphidine); 3-azabicyclo[6.3.0]undecane; 3-azabicyclo[3.1.0]hexane; 4-azabicyclo[5.3.0]decane; 3-azabicyclo[3.2.2]nonane; 3-azabicyclo[3.3.0]octane; tetrachloro isoindoline; tetrabromoisoindoline; and 3-azabicyclo[3.2.0]heptane. Examples of haloalkylaryl ketones that may be employed are: γ-chloro-p-fluorobutyrophenone; γ-chloro-p-fluoropropiophenone; γ-chloro-butyrophenone; γ-chloro-acetophenone; γ-chloro-p-fluoroacetophenone; γ-chloro-p-allylbutyrophenone; γ-chloropropyl-2-thienyl ketone; γ-chloro-p-methoxybutyrophenone; γ-chloro-p-bromobutyrophenone; γ-p-dichlorobutyrophenone; γ-chloro-p-fluorovalerophenone; γ-chloro-p-fluorocaprylophenone; and γ-chloro-p-methylbutyrophenone.

In addition to the ketones set forth above, the instant invention additionally contemplates the treatment of the basic ketones of Formula 1 to form therapeutically usable, non-toxic acid addition salts. Since most of the compounds of Formula 1 are oils or low-melting solids, conversion into the solid, higher melting acid addition salts transforms such compounds into a more useful form for convenience of storage, compounding and administration.

The acid addition salts of the present invention are illustrated in Formula 2:

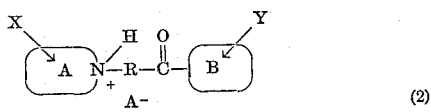

(2)

Formula 2, in which all terms except $A^-$ have the same significance as the corresponding symbols in Formula 1, illustrates the simple salt formation resulting from the salting of the ketone of Formula 1 with non-toxic acid anions, such as chloride, iodide, bromide, sulfate, acetate, succinate, maleate, phosphate, benzoate, lactate, thiodisalicylate, mucate, citrate, tartrate and the like. In general, those non-toxic salts of the basic ketones which are soluble in water or other well-tolerated solvents are particularly useful for the therapeutic purposes of the present invention due to the ease of administration of the salts in their dissolved form. In addition, other non-toxic salts may also be used.

In addition to the conversion of the free bases of Formula 1 into acid addition salts, the present invention also embraces the conversion of such free bases into quaternary salts. Such quaternary salts may be formed by the action of an appropriate ester on the bases of Formula 1 or, alternatively, may be formed directly by reacting an N-alkyl or alkenyl-substituted azabicycle or azatricyclo structure with an appropriate haloalkyl aryl ketone. Such quaternary salts are illustrated in Formula 3:

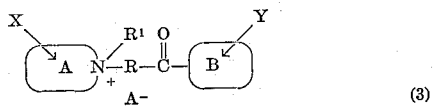

(3)

In the above formula, all symbols have the same significance as the corresponding symbols in Formulae 1 and 2, $R^1$ representing an alkyl, alkenyl or alkoxyalkyl preferably, but not necessarily, of 1 to 22 chain atoms.

The compounds of the present invention have marked pharmacological action on the central nervous system. Such compounds produce substantial and prolonged tranquilization at dosages of less than 1 mg./kg. At the same time, they possess toxicities in the range of 40–100 mg./kg. The average effective dosages employed to produce therapeutic effects in higher animals (such as monkeys) with these compounds range from 300–800 micrograms/kg. The compounds are, accordingly, extremely useful medicinally since the therapeutic ratios are 50 or greater in most cases.

The following examples illustrate the methods of preparation of the compounds of the present invention. In each of these examples, refluxing was performed at about the boiling point of the solvent.

EXAMPLE I

A. *2-[3-(4-fluorobenzoyl)propyl]-4-methyl-4,7-epoxyperhydroisoindoline*

Reaction of 15.3 gm. (0.1 mole) of 4-methyl-4,7-epoxyperhydroisoindoline with 10 gm. (0.05 mole) of 4-chloro-4′-fluorobutyrophenone in the presence of 0.1 gm. of potassium iodide in refluxing toluene for 24 hours, cooling and adding ether to precipitate 4-methyl-4,7-epoxyperhydroisoindoline hydrochloride, removal of this by filtration, stripping of the ether and toluene at the water pump and vacuum distillation of the residue yielded the title compound (9 gm.; 57% yield) with a boiling point of 150° C./0.12 mm.

B. *Acid addition salt*

Solution of the base above in absolute ether and passing in gaseous hydrogen chloride gave the corresponding hydrochloride salt (M.P. 185–186° C.). Recrystallization from acetone-ether gave a product of M.P. 187–188° C.

EXAMPLE II

A. *3-[3-(4-fluorobenzoyl)propyl]-1,8,8-trimethyl-3-azabicyclo[3.2.1]octane*

15.3 gm. (0.1 mole) of camphidine, 1,8,8-trimethyl-3-azabicyclo[3.2.1]octane, and 10 gm. (0.05 mole) of 4-chloro-p-fluorobutyrophenone were refluxed for one week in xylene. On cooling and adding ether, camphidine hydrochloride crystallized and was removed by filtration. The filtrate was stripped of solvents and vacuum distilled. The product distilled at 160–170° C./0.08 mm.

B. *Acid addition salt*

The base was dissolved in ether and treated with gaseous hydrogen chloride. The hydrochloride was removed by filtration and melted at 176–180° C. Two recrystallizations from acetone-ether gave a product with M.P. 184–5° C.

EXAMPLE III

*2-[3-(4-fluorobenzoyl)propyl] perhydroisoindoline*

This compound was prepared in a manner analogous to the procedure detailed in Example I from perhydroisoindoline and 4-chloro-p-fluorobutyrophenone. The hydrochloride melted at 152.5–153.5° C.

EXAMPLE IV

*2-[3-(4-fluorobenzoyl)propyl]-4,7,8,9-tetrahydroisoindoline*

Twelve and three tenths grams (0.1 mole) of 4,7,8,9-tetrahydroisoindoline, when reacted with 10 gm. (0.05 mole) of 4-chloro-4′-fluorobutyrophenone as described in Example I, yielded the title compound (7 gm.; 49% yield; B.P. 135–140° C./0.2 mm.). The hydrochloride, formed as in Example I, melted at 137.5–138.5° C.

EXAMPLE V

A. *3-[3-(4-fluorobenzoyl)propyl]-3-azabicyclo[3.2.2]nonane*

Refluxing 25.4 gm. (0.2 mole) of 3-azabicyclo[3.2.2] nonane with 20 gm. (0.1 mole) of 4-chloro-4′-fluorobutyrophenone as described in Example I yielded the title compound (21 gm.; yield 73%) with a boiling point of 150–160° C./0.3 mm.

The hydrochloride, prepared as in Example I, melted at 185–186° C. Recrystallization from acetone-ether gave M.P. 187–188° C.

B. *Quaternary salt*

The methiodide, prepared by refluxing the base in 1:1 acetone-ethyl acetate for 1 hour with a 10% excess of methyl iodide, melted at 176–177° C. Recrystallization from methanol-ether gave a product with M.P. 178–179° C.

EXAMPLE VI

*2-[3-(4-chlorobenzoyl)propyl]-4-methyl-4,7-epoxyperhydroisoindoline*

Reaction of 15.3 gm. (0.1 mole) of 4-methyl-4,7-epoxyperhydroisoindoline and 10.9 gm. (0.05 mole) of 4,4′-dichlorobutyrophenone as described in Example I, cooling and adding ether, removal of the isoindoline hydrochloride by filtration and stripping all solvents at the water pump, removal of all distillable material below 100° C./0.2 mm. at the vacuum pump, dilution to 500 ml. with ether, filtering any insoluble material, and treating the ether solution with gaseous hydrogen chloride yielded the title compound as the hydrochloride (16 gm.; M.P. 161–3° C.). Two recrystallizations from acetone-ether gave a product with M.P. 167–168° C.

EXAMPLE VII

*2-[3-(fluorobenzoyl)propyl]-4,7-endomethano-4,7,8,9-tetrahydroisoindoline*

Reaction of 6.8 gm. (0.05 mole) of 4,7-endomethano-4,7,8,9-tetrahydroisoindoline with 5 gm. (0.025 mole) of 4-chloro-4'-fluorobutyrophenone as described in Example I yielded the title compound which was treated as described in Example VI. Treatment of its solution in ether with gaseous hydrogen chloride yielded the title compound hydrochloride with a melting point of 198–200° C., which was sharpened to 199–200° C. on recrystallization from methanol.

EXAMPLE VIII

Following are illustrations of alternative methods for the formation of quaternary salts:

(A) 8.5 gm. (0.05 mole) of N-methyl-4-methyl-4,7-epoxyperhydroisoindoline was refluxed for 8 hours with 10 gm. (0.05 mole) of 4-chrolo-4'-fluorobutyrophenone in ethyl acetate. On cooling and adding ether a nearly quantitative yield of the methochloride of 2-[3-(4-fluorobenzoyl)propyl] - 4-methyl-4,7-epoxyperhydroisoindoline (M.P. 203–204° C.) was obtained. Recrystallization from acetone-ether gave a product with M.P. 204–205° C.

(B) 2-[3-(2-thienoyl)propyl] - 2,4-dimethyl-4,7-epoxyperhydroisoindoline chloride was likewise obtained from the same amine used in A above and 3-chloropropyl-2-thienyl ketone, and melted at 197–198° C.

(C) 2-[3-(4-isopropylbenzoyl)propyl]-2,4 - dimethyl-4,7-epoxyperhydroisoindoline chloride was obtained from the amine used in A above and 4-chloro-4'-isopropyl-butyrophenone, and melted at 209–210° C.

EXAMPLE IX

*3-[3-(4-fluorobenzoyl)propyl]-3-azabicyclo[3.2.0]heptane*

Reaction of 3-azabicyclo[3.2.0]heptane with γ-chloro-p-fluoro butyrophenone as described in Example I yielded the title compound which was converted directly to the hydrochloride salt (M.P. 139–140° C.).

EXAMPLE X

*2-[3-(p-fluorobenzoyl)propyl]-4,7-endoethano-4,7,8,9-tetrahydroisoindoline*

The title compound was obtained as outlined in Example I from 4,7,8,9-tetrahydro-4,7-endoethanoisoindoline with 4-chloro-4'-fluorobutyrophenone in refluxing toluene. Its hydrochloride salt had a melting point of 199–200° C.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A compound selected from the group consisting of (1) a compound of the formula:

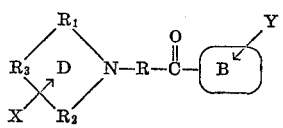

wherein ring D is an azabicarbocylic ring having a non-azo ring portion, wherein $R_1$ and $R_2$ are alkylene from 1 to 2 carbon atoms, said non-aza portion being defined by $R_3$ having 3 to 8 carbon atoms and being selected from the group consisting of (a) cycloalkanediyl, (b) cycloalkenediyl, (c) phenylene and (d) cycloalkanediyl or cycloalkenediyl having a methano, ethano or epoxy bridge; X and Y are selected from at least one of hydrogen, alkyl, alkenyl, alkoxy and halogen; R is alkylene; and ring B is phenyl or thienyl; (2) the non-toxic acid addition salts of (1); and (3) the non-toxic quaternary salts of (1) of the formula

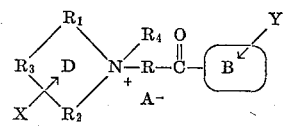

wherein $R_4$ is alkyl, alkenyl or alkoxyalkyl of 1 to 22 chain atoms, and X, $R_1$, $R_2$, $R_3$, R, Y and ring D are as set forth above; and $A^-$ is a pharmaceutically acceptable non-toxic anion.

2. A compound as defined in claim 1 wherein Y is fluorine.

3. A compound as defined in claim 2 wherein ring system A is non-aromatic.

4. A compound as defined in claim 1 wherein ring system A is non-aromatic.

5. 2-[3-(4-fluorobenzoyl)propyl]-4-methyl-4,7 - epoxyperhydroisoindoline.

6. 3-[3-(4-fluorobenzoyl)propyl]-1,8,8 - trimethyl - 3-azabicyclo[3.2.1]octane.

7. A compound of the formula

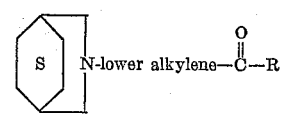

wherein R is selected from the group consisting of thienyl, phenyl, Y-thienyl, and Y-phenyl, where Y is selected from the group consisting of halogen, lower alkyl, and lower alkoxy.

8. A compound of the formula

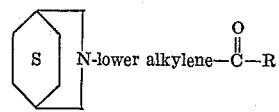

wherein R is selected from the group consisting of thienyl, phenyl, Y-thienyl and Y-phenyl, where Y is selected from the group consisting of halogen, lower alkyl and lower alkoxy, and the non-toxic, pharmaceutically acceptable acid addition salts thereof.

References Cited

UNITED STATES PATENTS 3,261,841   7/1966   Zenitz _____ 260—292

ALEX MAZEL, *Primary Examiner.*

HENRY R. JILES, D. McCUTCHEN, WALTER A. MODANCE, *Examiners.*

ALTON D. ROLLINS, J. W. MOLASKY,
*Assistant Examiners.*